United States Patent [19]
Tanei et al.

[11] 4,386,387
[45] May 31, 1983

[54] LOW TEMPERATURE SINTERING PORCELAIN COMPOSITION

[75] Inventors: Hirayoshi Tanei, Tokyo; Akira Ikegami; Hideo Arima, both of Yokohama; Tokio Isogai, Fujisawa; Kiyoshi Kawabata, Yokohama, all of Japan

[73] Assignee: Hitachi Chemical Company, Ltd., Tokyo, Japan

[21] Appl. No.: 321,609

[22] Filed: Nov. 16, 1981

[30] Foreign Application Priority Data

Nov. 18, 1980 [JP] Japan .................. 55-162867

[51] Int. Cl.$^3$ .................. H01G 4/12; C04B 35/46
[52] U.S. Cl. .................. 361/321; 501/134
[58] Field of Search .................. 501/134; 252/62.9 R; 361/320, 321

[56] References Cited

U.S. PATENT DOCUMENTS

| | | | |
|---|---|---|---|
| 3,468,800 | 9/1969 | Yokoyama et al. | 252/62.9 |
| 4,078,938 | 3/1978 | Yonezawa et al. | 501/134 |
| 4,236,928 | 12/1980 | Yonezawa et al. | 501/134 |

FOREIGN PATENT DOCUMENTS

| | | | |
|---|---|---|---|
| 56-17983 | 2/1981 | Japan | 501/134 |
| 2031398 | 4/1980 | United Kingdom | 501/134 |

Primary Examiner—Mark Bell
Attorney, Agent, or Firm—Antonelli, Terry & Wands

[57] ABSTRACT

A porcelain composition comprising $Pb(Fe_{2/3}W_{1/3})O_3$, $PbTiO_3$ and $Pb(Yb_{1/2}Nb_{1/2})O_3$ preferably within the range as defined by closed area of A-B-C-D-A in the accompanying triangular diagram can give a sintered product by sintering at a temperature as low as 1000° C. or lower. The resulting sintered product has a high relative dielectric constant and a small dielectric loss tangent.

7 Claims, 2 Drawing Figures

LOW TEMPERATURE SINTERING PORCELAIN COMPOSITION

BACKGROUND OF THE INVENTION

This invention relates to a porcelain (particularly dielectric) composition for low temperature sintering comprising lead ferro-tungstate, lead titanate and lead ytterbium-niobate as three major components, and if necessary together with manganese dioxide as a secondary component.

Heretofore, barium titanate ($BaTiO_3$) has been used as a major component for a material having a high relative dielectric constant and sinters at a temperature of 1300° to 1400° C. In order to enhance a relative dielectric constant of barium titanate at room temperature or to improve temperature characteristics of barium titanate, there is employed a process for adding various oxides such as strontium titanate ($SrTiO_3$), calcium stannate ($CaSnO_3$), calcium titanate ($CaTiO_3$), etc., to barium titanate. But since the sintering temperature is as high as 1300° to 1400° C. as mentioned above, the resulting barium titanate composition has disadvantages in that operations should be conducted at high temperatures, an expensive metal such as platinum, palladium, or the like which are suitable for said sintering temperature should be used as inner electrode, particularly in the case of forming a multilayer capacitor.

Therefore, it has long been desired to find out a porcelain composition which can be sintered at lower temperatures, particularly 1000° C. or lower, in the case of forming particularly multilayer capacitors, so as to give various remarkable advantages such as the use of less expensive metals, e.g., alloys containing silver as a main component, as inner electrode in place of expensive metals mentioned above, the use of a less expensive furnace because of the low sintering temperature, and saving of heat energy.

SUMMARY OF THE INVENTION

It is an object of this invention to provide a porcelain composition which can be sintered at such a lower temperature as 1000° C. or lower considering the above-mentioned state of the art.

This invention provides a porcelain composition comprising lead ferro-tungstate ($Pb(Fe_{2/3}W_{1/3})O_3$), lead titanate ($PbTiO_3$) and lead ytterbium-niobate ($Pb(Yb_{1/2}Nb_{1/2})O_3$) as three major components, and if necessary together with manganese dioxide ($MnO_2$) as a secondary component.

BRIEF DESCRIPTION OF THE DRAWINGS

In the attached drawings.

DESCRIPTION OF THE PREFERRED EMBODIMENTS

Figure 1:
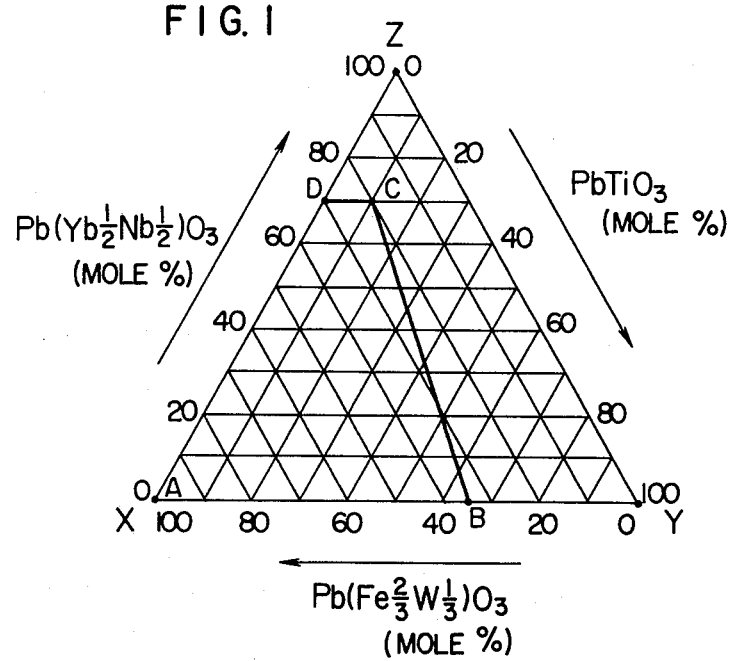
FIG. 1 is a triangular diagram showing a preferable range of the three components of $Pb(Fe_{2/3}W_{1/3})O_3(X)$, $PbTiO_3(Y)$ and $Pb(Yb_{1/2}Nb_{1/2})O_3(Z)$.

The porcelain composition of this invention contains $Pb(Fe_{2/3}W_{1/3})O_3(X)$, $PbTiO_3(Y)$ and $Pb(Yb_{1/2}Nb_{1/2})O_3(Z)$, preferably within the range as defined by closed area of A-B-C-D-A (values on the lines being not included) in the accompanying triangular diagram of FIG. 1, wherein the points A to D have the following compositions in percents by mole:

|   | (X) $Pb(Fe_{2/3}W_{1/3})O_3$ | (Y) $PbTiO_3$ | (Z) $Pb(Yb_{1/2}Nb_{1/2})O_3$ |
| --- | --- | --- | --- |
| A | 100 | 0 | 0 |
| B | 35 | 65 | 0 |
| C | 20 | 10 | 70 |
| D | 30 | 0 | 70 |

The procelain composition of this invention can be sintered at such a low temperature as 1000° C. or lower.

When the porcelain composition of this invention comprises 94 to 99.95% by mole of the above-mentioned components (X), (Y) and (Z) and 0.05 to 6% by mole of $MnO_2$, a secondary component, a total being 100% by mole, dielectric loss tangent (tan δ) becomes smaller in addition to the lower sintering temperature and products having various temperature characteristics of relative dielectric constants can be obtained.

The porcelain composition of this invention can be prepared from oxides, carbonates, hydroxides, chlorides, nitrates of lead, iron, tungsten, titanium, ytterbium, niobium and manganese. For example, oxides of individual ingredients (metals) are sufficiently mixed by a conventional mixing method, e.g., by using a mixing and grinding machine, a ball mill, or the like and then calcinated in the air at a temperature of preferably 650° to 900° C. to give the desired composition. If the calcination temperature is higher than 900° C., there is a tendency to calcinate the composition excessively and lead oxide undesirably evaporates in the early stage. On the other hand, if the calcination temperature is lower than 650° C., the calcination is undesirably insufficient. The calcination time depends on the kinds of starting materials, the proportions of starting materials and the calcination temperature. In general, a lower calcination temperature requires a longer calcination time. The calcination time is usually 0.5 to 8 hours.

The calcinated product is then ground by using, for example, a mixing and grinding machine, a ball mill, or the like, to give a powder having a desirable particle size. Usually the calcinated product is ground to have a particle size of 20 μm at most. The resulting calcinated powder is formed to a disc by a conventional press technique, followed by sintering. The resulting sintered product is, for example, used for producing a disc capacitor by forming electrodes thereon using, e.g., a silver electrode paste.

The porcelain composition for low temperature sintering of this invention is suitable for producing a dielectric in a multilayer capacitor, a thick film capacitor, etc. When multilayer capacitors and thick film capacitors are produced by using the porcelain composition of this invention, since less expensive alloys containing silver as a main component can be used as inner electrodes due to the sintering temperature of 1000° C. or less, the production cost can be lowered remarkably with easiness of the procedures due to the low temperature sintering.

This invention is illustrated by way of the following Examples and Comparative Examples.

EXAMPLES 1-22 AND COMPARATIVE EXAMPLES 1-3

Oxides selected from the group consisting of lead oxide (PbO), ferric oxide ($Fe_2O_3$), tungsten oxide (WO3), titanium oxide (TiO2), ytterbium oxide (Yb2O3), niobium oxide (Nb2O5) and manganese oxide (MnO2) were used as starting materials and weighed for giving compositions listed in Table 1. About 50 g of starting materials were used per batch. Individual oxides weighed and about 30 ml of distilled water were placed in a ball mill made of agate and mixed for about 8 hours. The resulting each mixture was placed in a platinum crucible and calcinated at 650°-850° C. for 1 to 2 hours. Each calcinated material was ground in a ball mill made of agate for 4 to 16 hours. To each powder obtained in an amount of 20 g, about 1 ml of an aqueous solution of 3% polyvinyl alcohol was added as a binder. Discs having a diameter of 15 mm and a thickness of about 1 mm were molded by applying a pressure of about 0.8 ton/cm$^2$ to individual binder-mixed powders. The discs were sintered at 900° to 1000° C. in Examples for 2 hours to give sintered products. Silver electrodes were formed on the sintered products to measure electrical properties.

Capacities and tan δ were measured by using capacitance bridge meter at a frequency of 1 kHz at 25° C. and relative dielectric constants were calculated from the measured values.

As Comparative Examples, porcelain compositions outside those of this invention were used. When these compositions were sintered at 1000° C. or lower, the resulting sintered products were brittle and could not be used for testing. Therefore, these compositions were sintered at 1100° C.

The results are as shown in Table 1.

TABLE 1

| Example No. | Major components (% by mole) X | Y | Z | MnO2 content (% by mole) | Sintering temperature (°C.) | Relative dielectric constant at 25° C. | Tan δ at 25° C. (%) |
|---|---|---|---|---|---|---|---|
| Examples 1 | 90 | 9 | 1 | 0.6 | 900 | 5700 | 2.1 |
| 2 | 75 | 24 | 1 | 0.2 | 900 | 11200 | 2.2 |
| 3 | 60 | 39 | 1 | 0.1 | 900 | 2700 | 1.0 |
| 4 | 35 | 64 | 1 | 0.1 | 1000 | 2000 | 2.1 |
| 5 | 70 | 20 | 10 | 0.6 | 950 | 5100 | 1.2 |
| 6 | 40 | 50 | 10 | 0.3 | 1000 | 2400 | 2.0 |
| 7 | 70 | 10 | 20 | 1.0 | 950 | 7800 | 1.4 |
| 8 | 60 | 20 | 20 | 0 | 950 | 5300 | 6.5 |
| 9 | " | " | " | 0.05 | " | 4700 | 5.0 |
| 10 | " | " | " | 0.1 | " | 4300 | 2.2 |
| 11 | " | " | " | 0.5 | " | 4000 | 1.0 |
| 12 | " | " | " | 1.0 | " | 4000 | 0.8 |
| 13 | " | " | " | 3.0 | " | 3100 | 2.5 |
| 14 | " | " | " | 5.0 | " | 2000 | 2.8 |
| 15 | " | " | " | 6.0 | " | 1800 | 3.8 |
| 16 | 40 | 40 | 20 | 1.0 | 1000 | 2600 | 2.2 |
| 17 | 55 | 15 | 30 | 0.6 | 950 | 2400 | 1.0 |
| 18 | 45 | 15 | 40 | 0.6 | 950 | 2000 | 1.5 |
| 19 | 37 | 13 | 50 | 0.6 | 950 | 1500 | 1.5 |
| 20 | 30 | 10 | 60 | 0.8 | 1000 | 1200 | 1.9 |
| 21 | 30 | 1 | 69 | 1.0 | 1000 | 1900 | 2.2 |
| 22 | 21 | 10 | 69 | 0.8 | 1000 | 1100 | 2.0 |
| Comparative Examples 1 | 30 | 69 | 1 | 0.1 | 1100 | 800 | 2.7 |
| 2 | 20 | 40 | 40 | 1.0 | 1100 | 900 | 2.0 |
| 3 | 20 | 5 | 75 | 1.0 | 1100 | 1000 | 2.5 |

Note
X: Pb(Fe⅔W⅓)O3
Y: PbTiO3
Z: Pb(Yb½Nb½)O3

Figure 2:
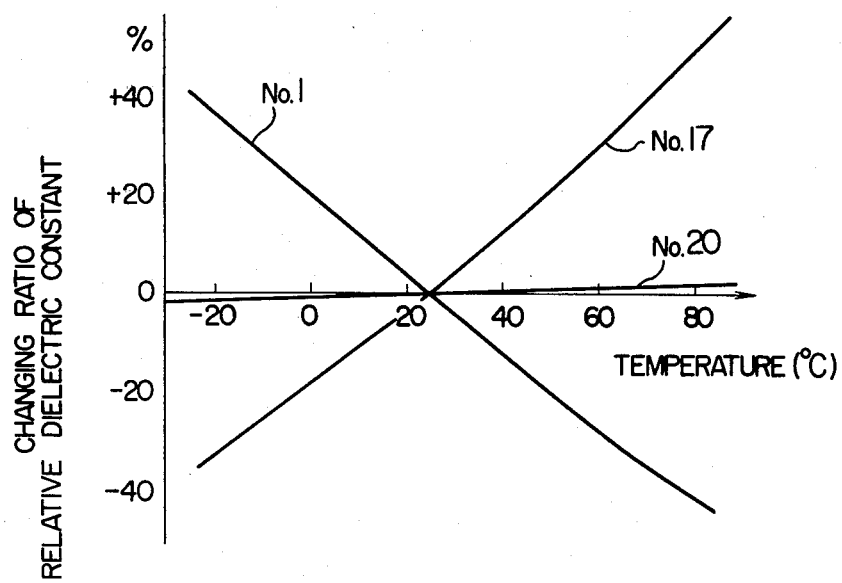
FIG. 2 is a graph showing relationships between changing ratios of relative dielectric constants and temperature as to sintered samples obtained by using the compositions of this invention.

As is clear from Table 1, the porcelain compositions of this invention can be sintered at a temperature of 1000° C. or lower and the resulting sintered products have relative dielectric constants of as high as 1000 to 11200 and relatively low dielectric loss tangent (tan δ). FIG. 2 shows changing ratios of relative dielectric constants of individual compositions as used in Examples 1, 17 and 20 depending on temperatures. In FIG. 2, the changing ratio is obtained from the following equation:

$$\Delta\epsilon_T = \frac{\epsilon_T - \epsilon_{25}}{\epsilon_{25}} \times 100(\%)$$

wherein
$\epsilon_T$: relative dielectric constant at a temperature T° C.
$\epsilon_{25}$: relative dielectric constant at 25° C.
$\Delta\epsilon_T$: changing ratio of relative dielectric constant at a temperature T° C.

As is clear from FIG. 2, the sintered products obtained from the porcelain compositions of this invention change their relative dielectric constants depending on temperatures variously, that is, in positive or in negative with various values.

Further as is clear from Table 1, addition of a limited amount of the secondary component, MnO2, makes dielectric loss tangent (tan δ) smaller. That is, when the amount of MnO2 is 0.05 to 6% by mole in the porcelain composition, the resulting sintered product shows the value of tan δ as excellent as 0.8 to 5.0%.

When the compositions having the three components (X), (Y) and (Z) outside the area closed by A-B-C-D-A in FIG. 1, the necessary sintering temperature is higher than 1000° C. Such compositions can be sintered at 1100° C. or higher to give sintered products which can be used as materials for producing capacitors. But such a high sintering temperature is disadvantageous considering the sintering procedure and inner electrode materials used for multilayer capacitors and thick film capacitors.

As mentioned above, the porcelain composition of this invention can be sintered at such a low temperature as 1000° C. or lower to give sintered products having a high relative dielectric constant of 1000 to 11200, a small dielectric loss tangent (tan δ) and various changing ratios from negative to positive relative dielectric constants depending on temperatures within the range of the three components as defined in this invention. Therefore, the sintered products are suitably be used as materials for producing not only usual disc capacitors but also multilayer capacitors and thick film capacitors. Further, the furnace used for sintering the porcelain composition of this invention can only have heat resistance of up to 1000° C., so that the price of the furnace can be reduced remarkably and heat energy consumed can also be saved remarkably due to the low sintering temperature. In addition, when multilayer capacitors and thick film capacitors are formed, not expensive alloys containing silver as a main component can be used as inner electrode in place of expensive platinum, palladium or the like, which results in lowering the production cost of these capacitors without lowering their properties.

What is claimed is:
1. A porcelain composition for low temperature sintering consisting essentially of a component (X) of Pb(Fe$_{2/3}$W$_{1/3}$)O$_3$, a component (Y) of PbTiO$_3$ and a component (Z) of Pb(Yb$_{1/2}$Nb$_{1/2}$)O$_3$, with the sum of component (X), (Y) and (Z) being 100 Mole %, the proportions of the components (X), (Y) and (Z) being within the closed area of lines A-B-C-D-A in the triangular diagram of FIG. 1, with the values on the lines being excluded, and the points A to D having the following compositions in percents by mole:

|   | (X) | (Y) | (Z) |
|---|-----|-----|-----|
| A | 100 | 0   | 0   |
| B | 35  | 65  | 0   |
| C | 20  | 10  | 70  |
| D | 30  | 0   | 70. |

2. A porcelain composition according to claim 1, to which is added $MnO_2$ in an amount of 0.05 to 6% by mole based on 94 to 99.95% by mole of $Pb(Fe_{2/3}W_{1/3})O_3(X)$, $PbTiO_3(Y)$ and $Pb(Yb_{1/2}Nb_{1/2})O_3(Z)$, a total being 100% by mole.

3. A sintered product obtained by sintering the porcelain composition of claim 1 at a temperature of 1000° C. or lower.

4. A sintered product obtained by sintering the porcelain composition of claim 2 at a temperature of 1000° C. or lower.

5. A porcelain composition according to claim 1, wherein the proportions of components (X), (Y) and (Z) are defined by the following relationship in terms of percents by mole:

$$21 \leq X \leq 90$$

$$1 \leq Y \leq 64,$$

and $$1 \leq Z \leq 69.$$

6. A multilayer capacitor comprising a sintered product of claim 3 and an inner electrode made of an alloy containing silver as a main component.

7. A thick film capacitor comprising a sintered product of claim 3 and an inner electrode made of an alloy containing silver as a main component.

* * * * *